(12) United States Patent
Bartol, Jr.

(10) Patent No.: US 8,299,659 B1
(45) Date of Patent: Oct. 30, 2012

(54) ELECTRIC POWER GENERATOR APPARATUS

(76) Inventor: Robert J. Bartol, Jr., Boise, ID (US)

( * ) Notice: Subject to any disclaimer, the term of this patent is extended or adjusted under 35 U.S.C. 154(b) by 199 days.

(21) Appl. No.: 12/856,589

(22) Filed: Aug. 14, 2010

(51) Int. Cl.
*H02K 35/00* (2006.01)
*H02K 21/00* (2006.01)
*H02K 11/00* (2006.01)

(52) U.S. Cl. .................. 310/36; 310/152; 310/68 R
(58) Field of Classification Search .......... 310/152, 310/15–39; 74/DIG. 9; *H03K 53/00*
See application file for complete search history.

(56) References Cited

U.S. PATENT DOCUMENTS

| | | | | |
|---|---|---|---|---|
| 3,011,062 A | * | 11/1961 | Goldsmith | 290/53 |
| 4,260,901 A | * | 4/1981 | Woodbridge | 290/42 |
| 5,934,882 A | * | 8/1999 | Olney et al. | 417/233 |
| 6,201,329 B1 | * | 3/2001 | Chen | 310/90.5 |
| 7,482,718 B2 | * | 1/2009 | Terzian et al. | 310/37 |
| 8,169,091 B2 | * | 5/2012 | Powers | 290/1 R |
| 2003/0066830 A1 | * | 4/2003 | Reed et al. | 219/672 |

OTHER PUBLICATIONS

Kalyan Annamalai and Ishwar K . Puri, Advanced Thermodynamics Engineering, CRC Press 2001, Chapter II, pp. 1-4.*

* cited by examiner

*Primary Examiner* — Quyen Leung
*Assistant Examiner* — Thomas Truong
(74) *Attorney, Agent, or Firm* — Adam R. Stephenson, Ltd.

(57) ABSTRACT

A power generator has a pendulum extending downwardly from an axle. The pendulum includes a plurality of bar magnets oriented parallel to the axle and being arranged in an arc equidistant and coaxial from the axle. The plurality of bar magnets are arranged in an alternating pole arrangement. The axle is mounted between two base units with each base unit including a pickup coil positioned proximate to the arc. The pickup coils generate an alternating electrical current as the bar magnets pass thereover.

3 Claims, 5 Drawing Sheets

ELECTRIC POWER GENERATOR APPARATUS

TECHNICAL FIELD

Aspects of this document relate generally to the field of power generators, and, more particularly, to power generators which utilize a pendulum.

BACKGROUND

Many conventional power generators create various types of pollution or require the burning of ever more expensive and ever more scarce fossil fuels. Various power generation technologies such as solar panels, wind turbines, hydroelectric systems, tidal systems and the like generate power from alternative sources of energy.

SUMMARY

Embodiments of power generators may include a pendulum extending downwardly from an axle where the pendulum includes a plurality of bar magnets oriented parallel to the axle and which are arranged in an arc equidistant and coaxial from the axle. The plurality of bar magnets may be arranged in an alternating pole arrangement and the axle may be mounted between two base units. Each base unit may include a pickup coil positioned proximate to the arc and generating an alternating electrical current as the bar magnets pass thereover.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments will hereinafter be described in conjunction with the appended drawings, where like designations denote like elements, and.

DESCRIPTION

Figure 1:
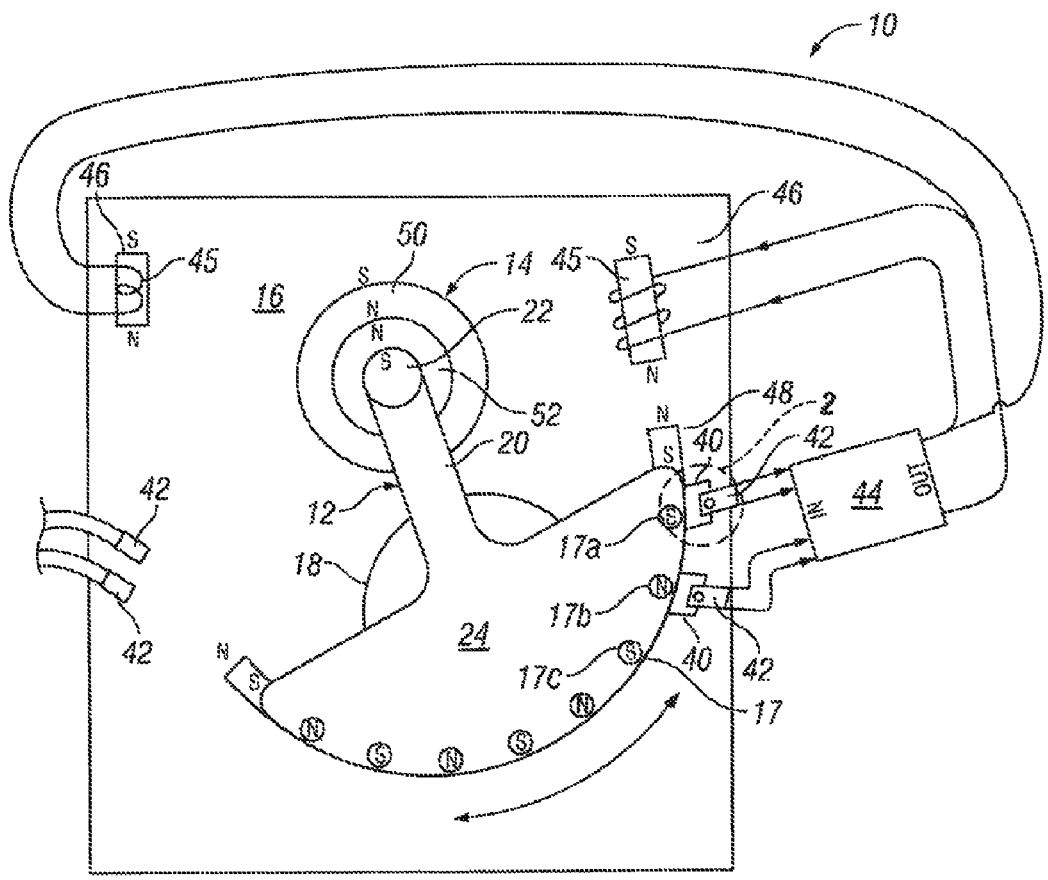
FIG. 1 is a front view of an embodiment with one pickup coil removed for purposes of explanation.
Figure 2:
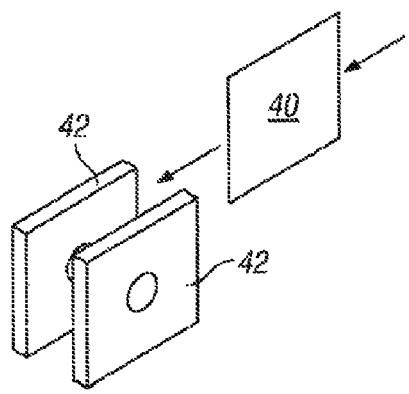
FIG. 2 is a close up of circled area 2 in FIG. 1.

Referring more particularly to the drawings by characters of reference, FIGS. 1-8 disclose combinations of features which constitute the components of a power generator 10 of a particular embodiment. In the illustrated embodiment, power generator 10 comprises a pendulum 12 extending downwardly from an axle 22. Axle 22, in turn, in mounted at both ends thereof to two base units 16 by magnetic bearings 14. In the illustrated embodiment, each magnetic bearing 14 uses a base unit ring magnet 50 which surrounds an axle ring magnet 52 which are oriented with like poles facing each other to prevent contact and hence minimize friction. Each pendulum also includes a plurality of bar magnets 17 arranged to alternate poles as discussed in more detail below. The base units 16 each include a pickup coil 18.

Figure 3:
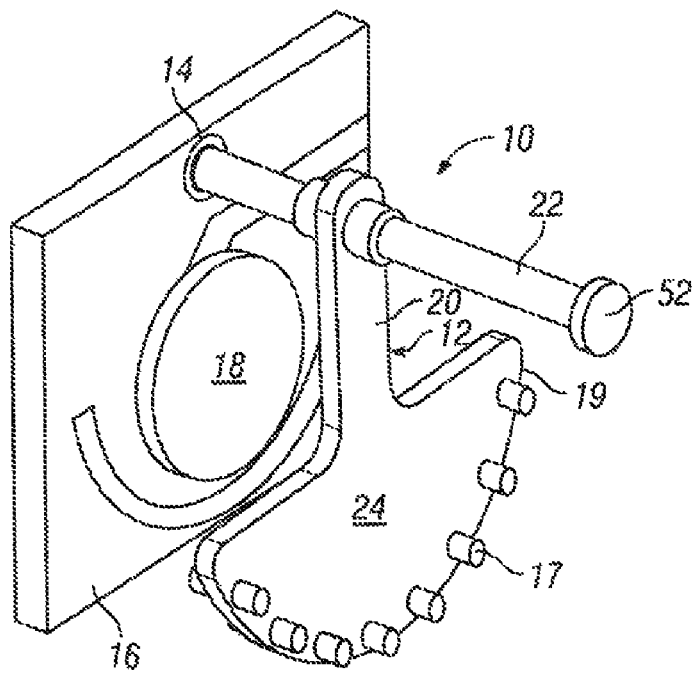
FIG. 3 is a side and top perspective view of FIG. 1.
Figure 4:
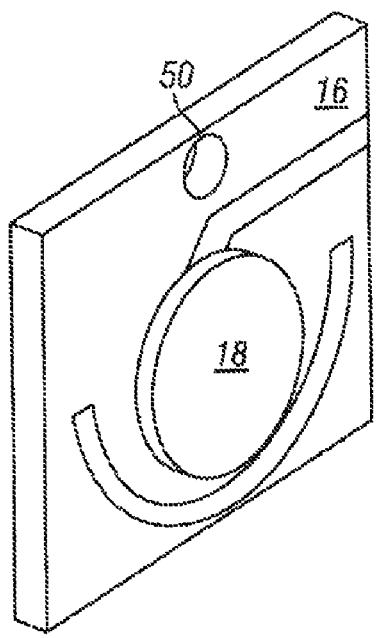
FIG. 4 is a side and top perspective view of a base unit employed in a particular embodiment.
Figure 5:
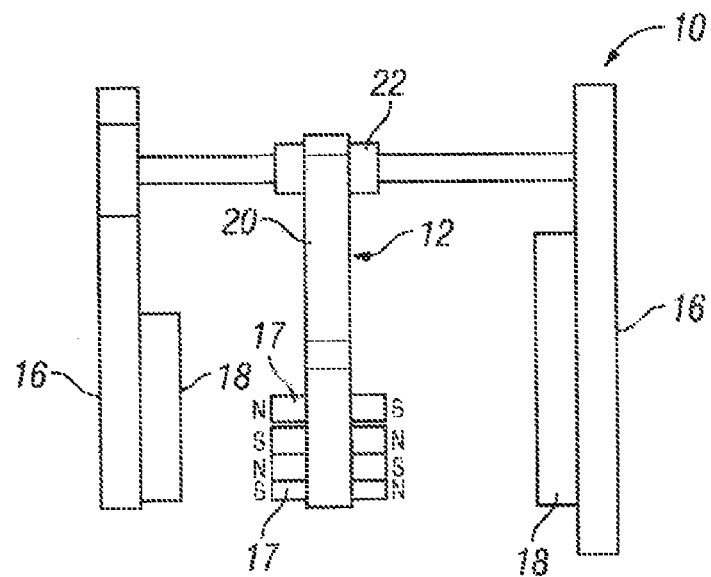
FIG. 5 is a side view of an embodiment in a first position.

As best seen in FIGS. 1, 3 and 5, pendulum 12 includes an arm 20 extending downwardly from an axle 22. The plurality of bar magnets 17 are mounted on arm 20 and arranged in an arc 19 parallel, equidistant and coaxial from axle 22. For purposes of illustration, a semicircular base 24 is provided on arm 20 to provide the arc 19 but those skilled in the art will recognize that there are many methods and designs which can position bar magnets 17 equidistant from axle 22. For example, each bar magnet 17 could be mounted on a radial arm of equal lengths extending downward from axle 22.

Figure 6:
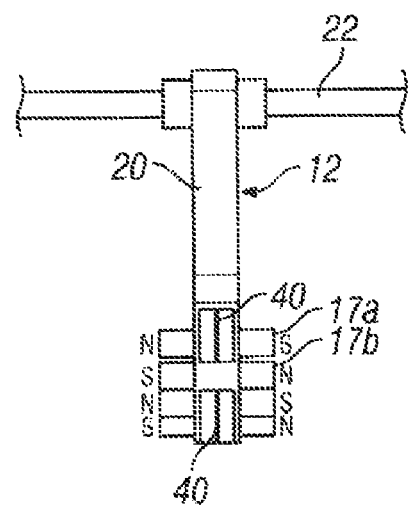
FIG. 6 is a partial side view of an embodiment in a second position.

The bar magnets 17 are arranged in alternating alignment as best seen in FIG. 1. The end of first bar magnet 17a at the right side has a south pole S, the end of the second bar magnet 17b has a north pole N, the end of the third bar magnet 17 has south pole S and so on. As shown in FIGS. 5 and 6, of course the ends of the bar magnets 17 on the other side of pendulum 12 will also alternate but in opposite fashion than the side visible in FIG. 1.

As pendulum 12 swings, bar magnets 17 pass near pickup coils 18 on base units 16. As each bar magnet 17 passes, pickup coils 18 will generate an alternating electric current. This current can be captured to charge batteries and/or power electrical appliances and the like.

To control, a pair of optical plates 40 extend outwardly from arc 19 at one end thereof. Optical plates 40 are positioned to pass between light detecting devices 42 which are mounted to base units 16 as pendulum 12 swings. Light detecting devices 42 are in electrical communication with variable time delay circuit 44. Variable time delay circuit 44 is, in turn, in electrical communication with booster coil 45 which is wound around a stationary magnet 46. Stationary magnet 46 is mounted on base unit 16 just beyond but proximate to the extent of the swing of arc 19.

Mounted at either end of arc 19 are second bar magnets 48. Second bar magnets 48 and stationary magnets 46 are oriented whereby like poles, either NN or SS, are facing one another. This provides a limit as to how far pendulum 12 can swing since the like poles will repel each other. This repelling movement is reinforced when variable time delay circuit 44 sends a current pulse into booster coil 45 in response to signals received from light detecting devices 42. The current pulse increases the magnetic repelling force of stationary magnet 46 against second bar magnet 48. During operation, as arm 12 reaches its limit, and starts its downswing, the current pulse to the coil around magnet 46 is applied during the downswing and is adjusted by the variable time delay to obtain maximum downward thrust, which is aided by the Earth's gravitational pull on arm 12. In particular embodiments, power for the current pulse is provided from pickup coils 18.

Figure 7:
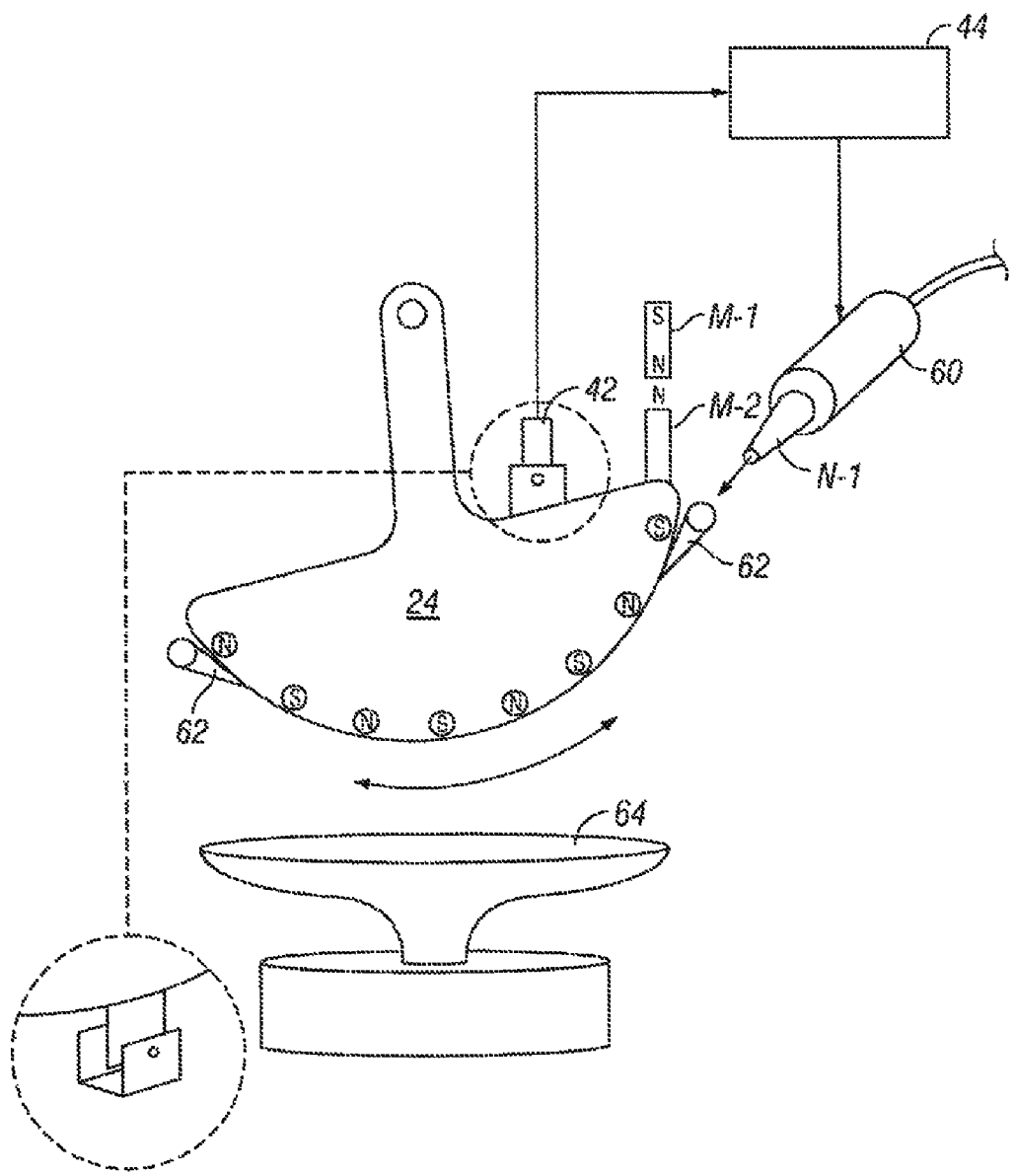
FIG. 7 is a side view of another embodiment of a power generator apparatus.
Figure 8:
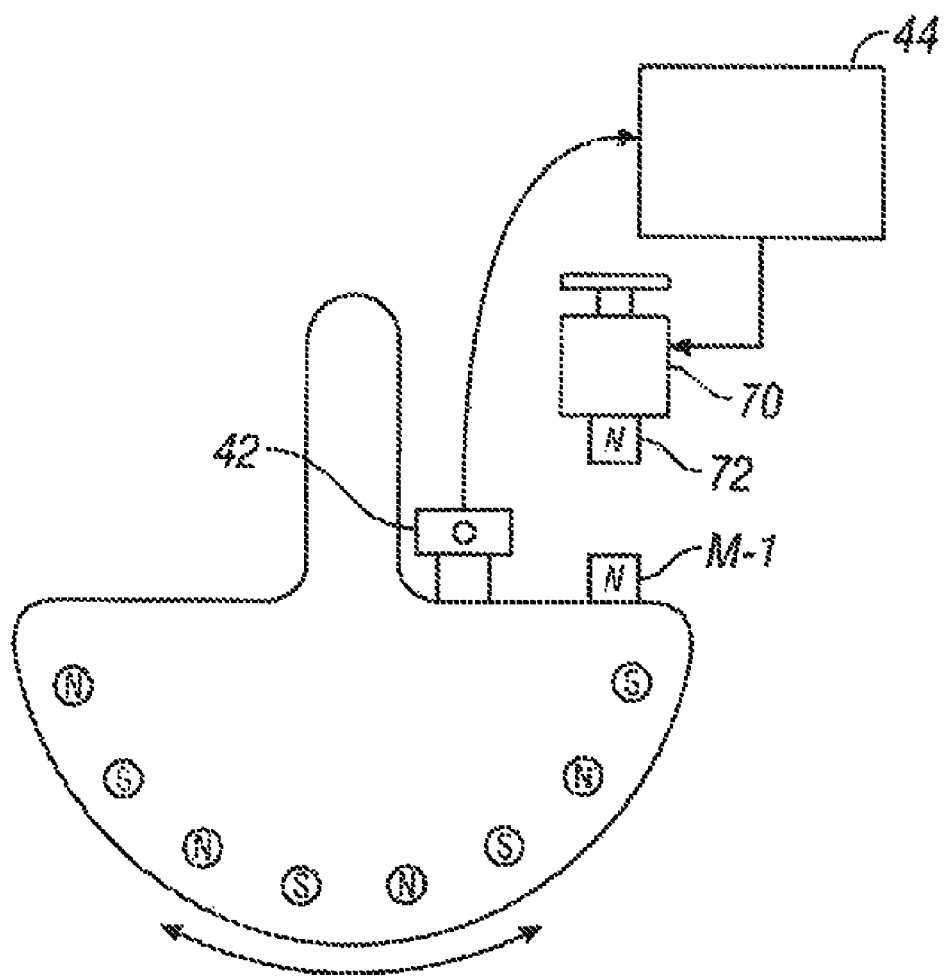
FIG. 8 is a side view of a portion of another embodiment of a power generator apparatus.

In alternate embodiments illustrated in FIGS. 7 and 8, force from various components is applied during the downswing to increase the downward force, which is aided by the Earth's gravitational pull. Accordingly, in the alternate embodiment depicted in FIG. 7, variable time delay circuit 44 sends its current pulse into a solenoid 60 which squirts either water or compressed air into a cone 62 mounted on the pendulum 12. If water is used, a water collector 64 catches the water and recirculates to solenoid 60. Water can be obtained from either a home supply or a business. The water or air from solenoid 60 repels pendulum 12 and provides impetus for a swing in the opposite direction. Also in this alternate embodiment, light detecting devices 42 are mounted atop semicircular base 24.

In an alternate embodiment depicted in FIG. 8, a solenoid 70 is in electrical communication with variable time delay circuit 44. Solenoid 70, when actuated, extends a solenoid magnet 72 towards pendulum 12. A pendulum magnet M-1 is mounted atop the semicircular base. When solenoid magnet 72 is actuated, one pole thereof is positioned proximate to the like pole of pendulum magnet M-1 when pendulum 12 reaches the end of its swing arc. In the illustrated embodiment, the like poles are north poles. However, south poles will function in exactly the same manner. The like poles of pendulum magnet M-1 and solenoid magnet 72 will repel each other thereby providing impetus to pendulum 12. Also in this embodiment, light detecting devices 42 may be included and utilized as described in other embodiments disclosed herein.

In places where the description above refers to particular embodiments of power generators, it should be readily apparent that a number of modifications may be made without departing from the spirit thereof and that these aspects may be applied to other power cable embodiments.

What is claimed is:

1. A power generator comprising a pendulum extending downwardly from an axle, the pendulum including a plurality of bar magnets oriented parallel the axle and being arranged in an arc equidistant and coaxial from the axle, the plurality of bar magnets being arranged in an alternating pole arrangement, the axle mounted between two base units, each base unit including a pickup coil positioned proximate to the arc, the pickup coils generating an alternating electrical current as the bar magnets pass thereover, the power generator further comprising a pair of optical plates which extend outwardly from the arc at each end thereof each optical plate being positioned to pass between corresponding light detecting devices which are mounted to the base units as the pendulum swings, wherein the light detecting devices are in electrical communication with a variable time delay circuit, the variable time delay circuit being in electrical communication with a booster coil which is wound around a stationary magnet and the stationary magnet is mounted on the base unit just beyond but proximate to the extent of the swing of the arc where a pair of corresponding second bar magnets are mounted on the arc and extend in the direction of the arc with like poles facing the stationary magnets to limit the swing of the pendulum, and the variable time delay circuit sends a current puke into the booster coil in response to signals received from the corresponding light detecting devices to increase the magnetic repelling force of the stationary magnet against one of the second bar magnets.

2. The power generator of claim 1 wherein the power for the current pulse is provided by the pickup coils and the current pulse is applied during a downswing of the pendulum.

3. A power generator comprising a pendulum extending downwardly from an axle, the pendulum including a plurality of bar magnets oriented parallel to the axle and being arranged in an arc equidistant and coaxial from the axle, the pendulum having an arm extending downwardly from the axle and a semicircular base provided on the arm which defines the arc, the plurality of bar magnets being arranged in an alternating pole arrangement and the axle mounted being between two base units at either end thereof by magnetic bearings, each magnetic bearing including a base unit ring magnet mounted on the base unit which surrounds an axle ring magnet mounted on the corresponding axle end where the base unit magnet and the axle ring magnet are oriented with like poles facing each other thereby preventing physical contact and therefore minimizing friction, and each base unit includes a pickup coil positioned proximate to the arc, the pickup coils generating an alternating electrical current as the bar magnets pass thereover, and a pair of optical plates which extend outwardly from the arc at each end thereof, each optical plate being positioned to pass between corresponding light detecting devices which are mounted to the base units as the pendulum swings, the light detecting devices being in electrical communication with a variable time delay circuit, the variable time delay circuit being in electrical communication with a booster coil which is wound around a stationary magnet, the stationary magnet being mounted on the base unit just beyond but proximate to the extent of the swing of the arc, where a pair of corresponding second bar magnets being mounted on the arc extend in the direction of the arc with like poles facing the stationary magnets to limit the swing of the pendulum, wherein the variable time delay circuit sends a current pulse into the booster coil in response to signals received from the corresponding light detecting devices to increase the magnetic repelling force of the stationary magnet against the second bar magnet and power for the current pulse is provided by the pickup coils.

* * * * *

UNITED STATES PATENT AND TRADEMARK OFFICE
CERTIFICATE OF CORRECTION

PATENT NO. : 8,299,659 B1  
APPLICATION NO. : 12/856589  
DATED : October 30, 2012  
INVENTOR(S) : Robert J. Bartol, Jr.

Page 1 of 1

It is certified that error appears in the above-identified patent and that said Letters Patent is hereby corrected as shown below:

Column 3, line 31, cancel the text "end thereof each optical plate" and insert --end thereof, each optical plate--

Column 3, line 43, cancel the text "sends a current puke into" and insert --sends a current pulse into--

Signed and Sealed this
First Day of January, 2013

David J. Kappos
*Director of the United States Patent and Trademark Office*